United States Patent
Ruiz et al.

(10) Patent No.: US 9,833,950 B2
(45) Date of Patent: Dec. 5, 2017

(54) SYSTEM AND METHOD FOR INOPERATIVE INKJET DETECTION IN A PRINTER OF THREE-DIMENSIONAL OBJECTS

(71) Applicant: Xerox Corporation, Norwalk, CT (US)

(72) Inventors: Erwin Ruiz, Rochester, NY (US);
Jeffrey N. Swing, Rochester, NY (US);
Paul M. Fromm, Rochester, NY (US);
Steven M. Russel, Bloomfield, NY (US)

(73) Assignee: Xerox Corporation, Norwalk, CT (US)

( * ) Notice: Subject to any disclaimer, the term of this patent is extended or adjusted under 35 U.S.C. 154(b) by 550 days.

(21) Appl. No.: 14/503,492

(22) Filed: Oct. 1, 2014

(65) Prior Publication Data

US 2016/0096328 A1     Apr. 7, 2016

(51) Int. Cl.
| | | |
|---|---|---|
| B29C 67/00 | (2017.01) | |
| B29C 64/393 | (2017.01) | |
| B29C 64/245 | (2017.01) | |
| B29C 64/241 | (2017.01) | |
| B29C 64/112 | (2017.01) | |
| B29C 64/386 | (2017.01) | |
| B41J 2/165 | (2006.01) | |
| B41J 2/21 | (2006.01) | |
| B29C 64/35 | (2017.01) | |
| B33Y 30/00 | (2015.01) | |
| B33Y 50/02 | (2015.01) | |

(52) U.S. Cl.
CPC ........ B29C 67/0088 (2013.01); B29C 64/112 (2017.08); B29C 64/241 (2017.08); B29C 64/245 (2017.08); B29C 64/386 (2017.08); B29C 64/393 (2017.08); B29C 67/0059 (2013.01); B41J 2/16579 (2013.01); B41J 2/16585 (2013.01); B41J 2/2142 (2013.01); B41J 2/2146 (2013.01); B29C 64/35 (2017.08); B33Y 30/00 (2014.12); B33Y 50/02 (2014.12)

(58) Field of Classification Search
None
See application file for complete search history.

(56) References Cited

U.S. PATENT DOCUMENTS

| | | | |
|---|---|---|---|
| 4,907,013 A | 3/1990 | Hubbard et al. | |
| 5,099,256 A | 3/1992 | Anderson | |
| 6,169,605 B1 * | 1/2001 | Penn | B29C 67/0059 358/1.1 |
| 7,338,144 B2 | 3/2008 | Mantell et al. | |
| 7,824,001 B2 | 11/2010 | Fienup et al. | |
| 8,017,055 B2 | 9/2011 | Davidson et al. | |
| 8,747,097 B2 | 6/2014 | Pettis | |
| 8,783,819 B2 * | 7/2014 | Snyder | B41J 2/16579 347/19 |

(Continued)

*Primary Examiner* — Matthew Daniels
*Assistant Examiner* — Manley L Cummins, IV
(74) *Attorney, Agent, or Firm* — Maginot Moore & Beck LLP

(57) ABSTRACT

A three dimensional printer is configured to move at least one printhead from an area where the printhead is forming an object to a position opposite a shaft. The at least one printhead is operated to eject material onto the shaft and the shaft is rotated to enable a light sensor to generate signals indicative of a height of material at a plurality of positions on the shaft. The signals are compared to an expected height of material at each position to identify inoperative inkjets in the at least one printhead.

11 Claims, 5 Drawing Sheets

(56) References Cited

U.S. PATENT DOCUMENTS

2006/0111807 A1* 5/2006 Gothait .............. B29C 67/0059
700/119
2012/0075367 A1* 3/2012 VanKouwenberg ... B41J 2/0057
347/9

* cited by examiner

SYSTEM AND METHOD FOR INOPERATIVE INKJET DETECTION IN A PRINTER OF THREE-DIMENSIONAL OBJECTS

TECHNICAL FIELD

The device disclosed in this document relates to printers that produce three-dimensional objects and, more particularly, to the detection of faults within such printers.

BACKGROUND

Digital three-dimensional manufacturing, also known as digital additive manufacturing, is a process of making a three-dimensional solid object of virtually any shape from a digital model. Three-dimensional printing is an additive process in which one or more printheads eject successive layers of material on a substrate in different shapes. The substrate is supported either on a platform that can be moved three dimensionally by operation of actuators operatively connected to the platform, or the printhead or printheads are operatively connected to one or more actuators for controlled movement of the printhead or printheads to produce the layers that form the object. Three-dimensional printing is distinguishable from traditional object-forming techniques, which mostly rely on the removal of material from a work piece by a subtractive process, such as cutting or drilling.

The production of a three-dimensional object with these printers can require hours or, with some objects, even days. One issue that arises in the production of three-dimensional objects with a three-dimensional printer is consistent functionality of the inkjets in the printheads that eject the ink drops that form the objects. During printing of an object, one or more inkjets can eject material with a drop volume that is less than the desired amount or even clog completely. These volumetric differences can accumulate during the printing of the multiple layers that form an object so the column of material formed by the inkjet ejecting the smaller drops can be shorter than the surrounding material columns formed by the other inkjets. These surface variations can be significant enough to require the scrapping of the object. Because the print jobs can require many hours or multiple days to produce objects, this scrapping of objects can be expensive and time consuming. A printer capable of detecting and identifying inoperative inkjets during printing of an object would be advantageous.

SUMMARY

A three-dimensional object printer has been developed that facilitates the detection of inoperative inkjets during object printing. The printer includes at least one printhead having a plurality of inkjets configured to eject material, a shaft configured to rotate selectively, at least one light source, at least one light sensor, and a controller operatively connected to the at least one printhead, the shaft, the at least one light source and the at least one light sensor, the controller being configured to operate a first group of the inkjets in the at least one printhead to eject material onto the shaft, to rotate the shaft to a position that enables the material on the shaft to be between the at least one light source and the at least one light sensor to enable the at least one sensor to generate signals indicative of a height of material at a plurality of positions on the shaft, and to compare the signals generated by the at least one light sensor to an expected height value to identify inoperative inkjets in the at least one printhead.

A method for operating a three-dimensional object printer has been developed that facilitates the detection of inoperative inkjets during object printing. The method includes operating a first group of inkjets in at least one printhead with a controller to eject material onto a shaft, rotating the shaft with a controller to move the material on the shaft between a light source and a light sensor, generating with the light sensor signals indicative of a height of material at a plurality of positions on the shaft, and comparing with the controller the signals generated by the light sensor to an expected height for each position to identify inoperative inkjets in the at least one printhead.

BRIEF DESCRIPTION OF THE DRAWINGS

The foregoing aspects and other features of an apparatus or printer that detects volumetric drop variations in the inkjets during printing and compensates for these variations during the printing operation object are explained in the following description, taken in connection with the accompanying drawings.

DETAILED DESCRIPTION

Figure 1:
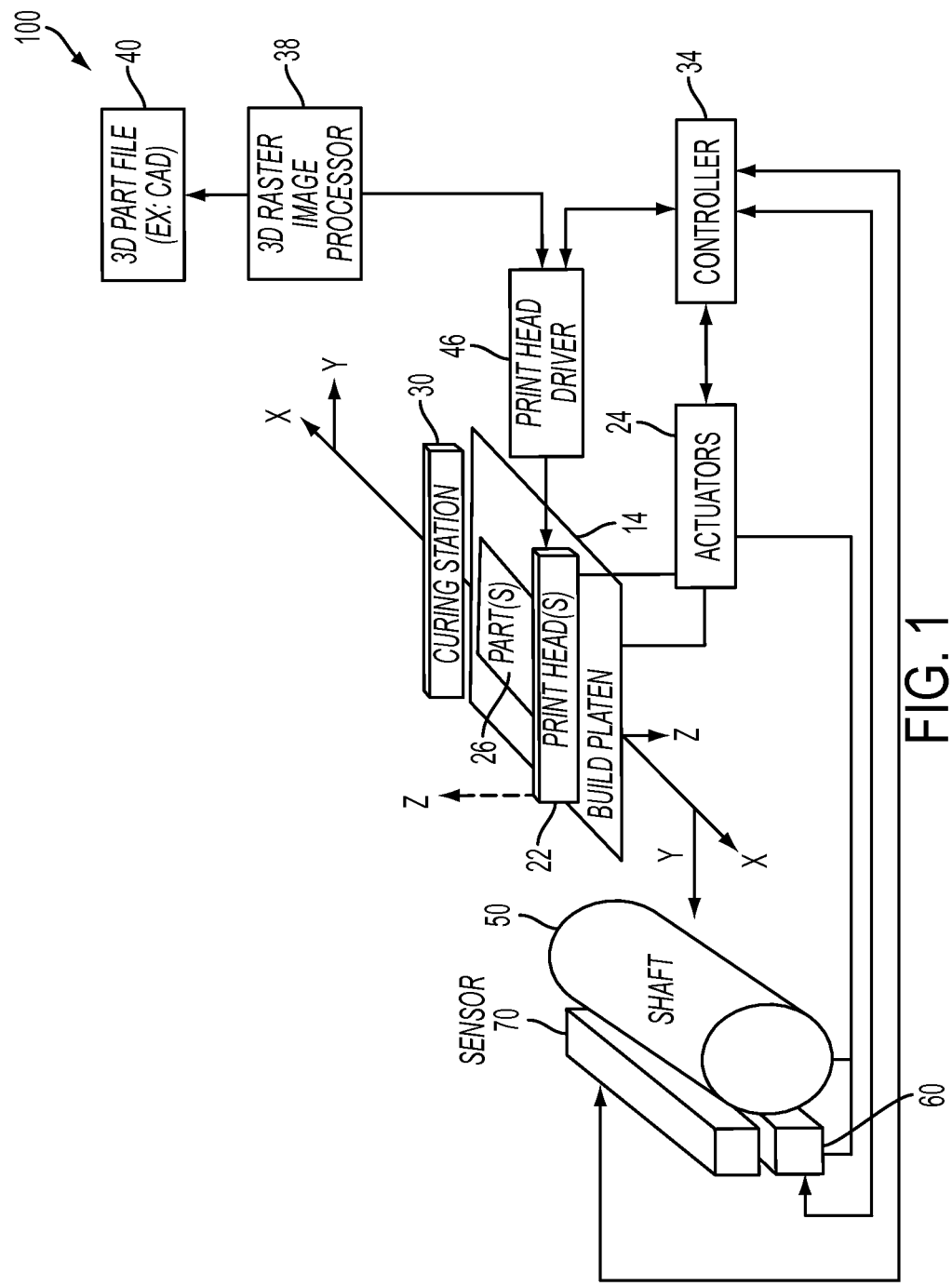
FIG. 1 illustrates a system for identifying inoperative inkjets in a three-dimensional object printer using a one-dimensional or two-dimensional light source and light sensor.

For a general understanding of the environment for the device disclosed herein as well as the details for the device, reference is made to the drawings. In the drawings, like reference numerals designate like elements.

Figure 5:
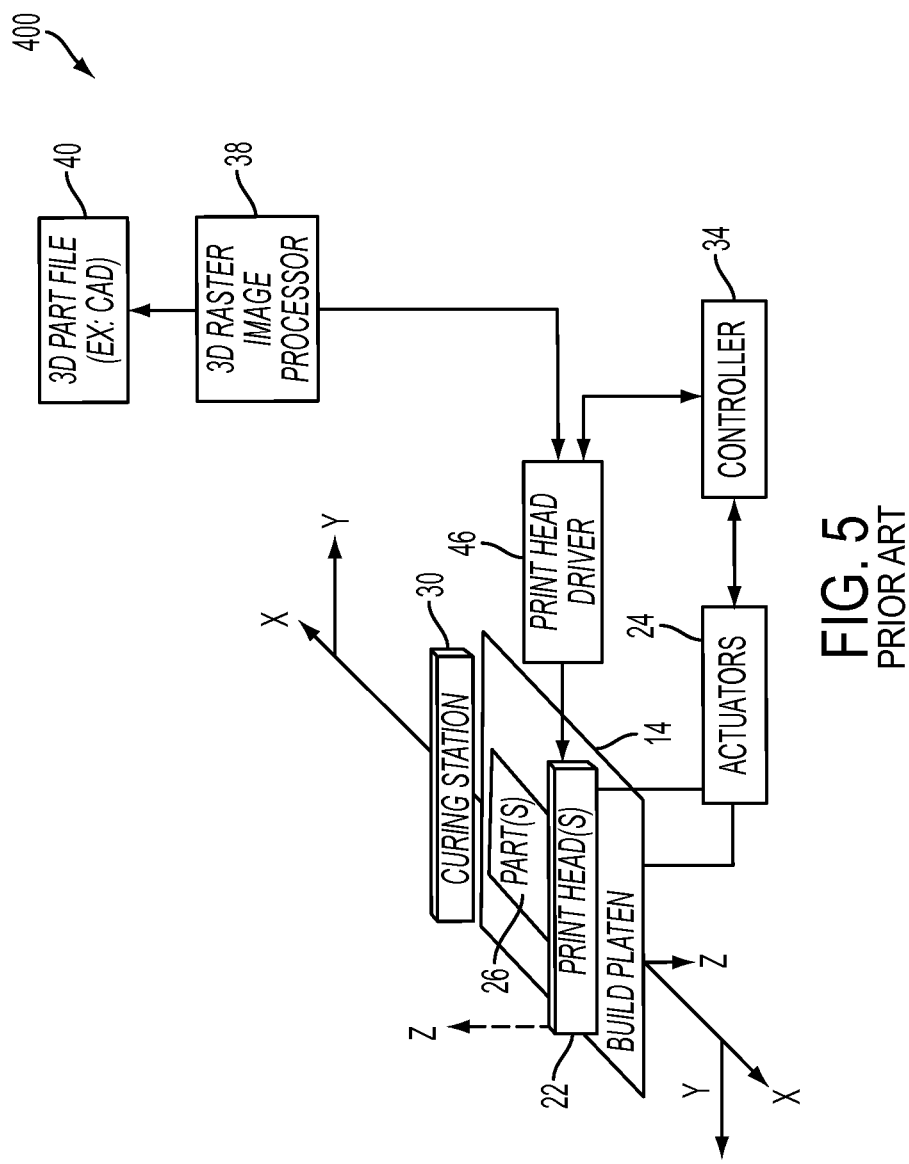
FIG. 5 is a block diagram of a prior art three-dimensional object printer that builds an object on a platen.

An embodiment of a prior art three-dimensional object printer is shown in FIG. 5. Using like reference numerals for like components, the printer 400 includes a platen 14, printhead(s) 22, actuators 24, curing station 30, a controller 34, a raster image processor 38 that generates raster data, and a printhead driver 46. A three-dimensional part file 40, such as that produced by a computer-aided design (CAD) system, is received by a three-dimensional raster image processor 38, which generates raster image data for the layers to be printed to form the part 26. The raster image processor 38 passes the raster image data to the printhead driver 46 and the driver generates the pixelated data for operating the ejectors in the printhead as well as for controlling movement of the platen 14 and the printhead(s) 22. The controller 34 operates the actuators 24 with reference to the data generated by the driver 46 to move one or both of the printhead(s) 22 and the platen 14 in the positive and negative X, Y and Z directions, as shown in the figure. From time to time as needed, if the material being ejected to form the object requires curing, the printhead(s) 22 are moved away from a position over the platen 14 and the controller 34 operates one of the actuators 24 to move the curing device 30 over the object to cure the material. When the curing operation is finished, the controller 34 operates an actuator 24 to return the curing station 30 to a position so the printhead(s) 22 can be returned to a position over the platen 14 so the object printing can resume. When all of the raster data have been used to operate the printhead(s) 22 to form the object, the printhead(s) 22 are moved to a position way from the platen so the object can be retrieved from the platen 14.

FIG. 1 illustrates a system for identifying inoperative inkjets in a three-dimensional object printer as a modification of the prior art three-dimensional printer shown in FIG. 5. The printer 100 includes all of the components of the printer 400 and additionally includes a shaft 50, sensor 70, and light source 60. The light source 60 can be a point source of light, a linear array of point light sources or a two-dimensional array of point light sources, such as LEDs or the like. A point light source is one that produces collimated beams of light. Alternatively, the light source can be a light pipe that emits light along the length of the light pipe. The light source 60 is located near the shaft 50 and positioned slightly below the shaft so the source emits light at a tangent to the shaft 50. The sensor 70 can be single light receptor, a linear array of light receptors or a two-dimensional array of light receptors, such as photodetectors or CCDs, that correspond to the resolution of the printheads in the printer. For example, if the printheads are 300 dpi printheads and are not interleaved, the light receptors are arranged with approximately 300 receptors per inch. If 300 dpi printheads are interleaved, the light receptors are arranged with approximately 600 receptors per inch. This arrangement enables each light receptor to correspond to a location on the shaft where an inkjet in the printer directs material onto the shaft. The sensor 70 is located near the shaft and positioned slightly above the shaft so the light receptors are in a path of the beam of light emitted by the light source 60 after the beam has passed the shaft 50. The light source 60, the light sensor 70, and the shaft are operatively connected to the actuators 24 so the controller 34 can synchronize the movements of these three components as described below to generate the signals indicative of a material height on the shaft.

Figure 4:
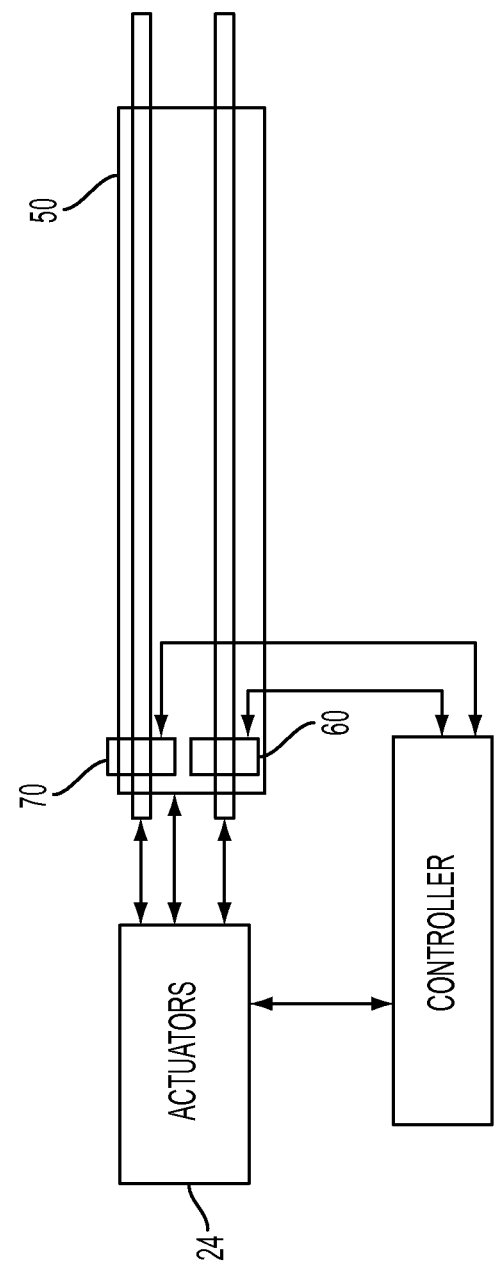
FIG. 4 illustrates a system for identifying inoperative inkjets in a three-dimensional object printer using a point light source and a single light receptor.

These various combinations of light sources and light receptors are used in the following ways to generate image data of the material drops ejected onto the shaft. In embodiments having a point light source and a single light receptor, such as the one shown in FIG. 4, the point light source and light receptor are configured to be opposite one another at a position that corresponds to the height of the ejected drops on the shaft. Additionally, the point light source 60 and the light receptor 70 are operatively connected to one or more actuators so the controller 34 can operate actuator(s) and move the source and sensor along the axial length of the shaft to provide a one-dimensional scan of the drops on the shaft. The shaft is parked at a position where the drops protrude into the path of the light. As the light source and sensor traverse the length of the shaft, the signal generated by the light receptor indicates at each expected drop location whether the light is blocked or received. If the light is blocked, then the drop is present at the expected location at the expected height. If the light is received, then either the drop is not present, not at the expected location or did not reach the expected height. These conditions indicate that an ejector is not operating correctly and the printhead requires servicing.

In embodiments in which the point light source and single light receptor are also configured to move radially with reference to the center longitudinal axis of the shaft, then a two-dimensional image of the ejected drops can be generated. In this embodiment, the point light source and light receptor traverse the length of the shaft as explained above. The light source 60 and light receptor 70 are also configured to move radially towards the shaft to direct light along a line tangent to the circumference of the shaft. As the light source and sensor traverse the length of the shaft, the signal generated by the light receptor indicates at each expected drop location whether the light is blocked or received. If the light is blocked, then the position of the drop is compared to the image data obtained at that location in the first pass. If no drop was previously sensed at that location, then either an errant drop has been located or the ejector is ejecting drops that are smaller than expected. Both conditions indicate a need to service the printhead. If light was received, then the ejector corresponding to that location is not operating at all.

In some embodiments, the single light source 60 and single light receptor 70 are configured for two-dimensional image data generation. In these embodiments, the shaft is also moved for imaging of the shaft and drops at a position slightly before the position where the full height of the drops, if accurately ejected, can be detected and also at a position slightly after the position where the full height of the drops, if accurately ejected, can be detected. This configuration enables three-dimensional image data to be generated so the position of the drops on the shaft can be detected as well as the height and width of the drops.

In embodiments having a linear array of light emitters that form the light source 60 and a liner array of light receivers that form the light sensor 70, the linear arrays are oriented parallel to the longitudinal axis of the shaft as shown in FIG. 1. Therefore, the one dimensional image data described above is obtained with the shaft positioned so the ejected drops are located where their maximum height, if accurately ejected, can be identified. Consequently, the light source and light sensor do not require any movement.

To obtain two-dimensional data with linear arrays of light emitters and light receivers oriented parallel to the longitudinal axis of the shaft as shown in FIG. 1, the linear arrays of emitters for the light source 60 and receptors for the light sensor 70 are moved radially with reference to the center of the shaft, as explained above, to provide image data of the ejected drops on shaft. This two-dimensional data is analyzed as noted above to determine whether a printhead requires service or not. Three-dimensional image data are obtained with the linear arrays of light emitters for the light source 60 and light receivers for the light sensor 70 oriented parallel to the longitudinal axis of the shaft by moving the shaft position slightly before the position where the full height of the drops, if accurately ejected, can be detected and also at a position slightly after the position where the full height of the drops, if accurately ejected, as noted above. Thus, the linear arrays of light emitters and light receptors enable more efficient operation of the printhead testing operation since no movement of the light emitters and light receptors in the axial direction of the shaft is required.

In embodiments having two-dimensional arrays of light emitters and light receptors, the shaft is positioned between the light emitters of the light source 60 and the light receptors of the light sensor 70 to enable the expected height of the ejected drops to be detected, if accurately ejected. The light emitters generate collimated light to ensure light from one line of emitters is not directed into the line of receptors not directly opposite the emitters. In these embodiments, the shaft is positioned to enable the light source and sensor to detect the maximum height and longitudinal position of the drops in two dimensional data with a single illumination and data capture. Additionally, three-dimensional data can be obtained by rotating the shaft to a position slightly before the position where the full height of the drops, if accurately ejected, can be detected and also at a position slightly after the position where the full height of the drops, if accurately ejected, can be detected. This configuration enables three-dimensional image data to be generated so the position of the drops on the shaft can be detected dimensionally as well as the height and width of the drops.

In the embodiments described above, the light receptors in the sensor 70 are operatively connected to the controller 34 to enable the controller 34 to receive the signals generated by the light receptors in the sensor 70. These signals are compared to image data used to operate the printhead(s) 22 to form a test pattern on the shaft 50 to determine whether the corresponding inkjets ejected material or the appropriate amount of material. The controller 34 operates the actuators 24 to synchronize the movement of the light source 60, the light sensor 70, and the rotation of the shaft 50 to provide one-dimensional, two-dimensional or three-dimensional data as described above. The position or positions of the receptor or receptors in the sensor are correlated to each signal generated by the receptors to provide the controller with an array of data values that are compared to the image data to determine whether an inkjet operated correctly.

The printhead(s) 22 comprise a plurality of inkjets 15 (shown in FIG. 2) and use the inkjets 15 to eject material. In one embodiment some inkjets 15 eject a build material whereas other inkjets 15 eject a support material. When the printhead(s) 22 are over the platen 14 they build the part(s) 26 through a series of incremental build cycles. The controller 34 tracks how many build cycles are performed by the printhead(s) 22. After a predetermined number of build cycles, the controller 34 operates an actuator 24 to move the printhead(s) 22 to a location proximate to and above the shaft 50. Once in this position, the printhead(s) 22 eject material onto the shaft 50. The controller 34 then operates an actuator 24 to return the printhead(s) 22 to a position over the platen 14 so that it can continue with the next build cycle. The controller 34 operates the shaft to rotate to a position in which the material deposited by the printhead(s) 22 is between the light source 60 and the sensor 70. The controller 34 operates the light source 60 to emit a beam of light towards the sensor 70. The sensor 70 outputs the signals generated by the light receptors in the sensor 70 to the controller 34. Each signal corresponds to the amount of light that reached each light receptor in the sensor 70. The controller 34 then compares each signal value received from the light receptors in the sensor 70 to a threshold value in order to determine if the material deposited on the shaft 50 by the inkjets 15 in the printhead(s) 22 reaches the minimum height. When the controller 34 determines that the predetermined number of build cycles has occurred again, the process repeats with the printhead(s) 22 returning to the position over the shaft 50 where the printhead(s) 22 eject material onto the shaft 50. In one embodiment, a different printhead 22 or different group of inkjets within the printhead(s) 22 ejects material onto the shaft 50. Because the shaft 50 is rotated to enable the height of the previously ejected material to be identified by the sensor 70, the portion of the shaft 50 onto which the second group of inkjets ejected material is clean.

Figure 2:
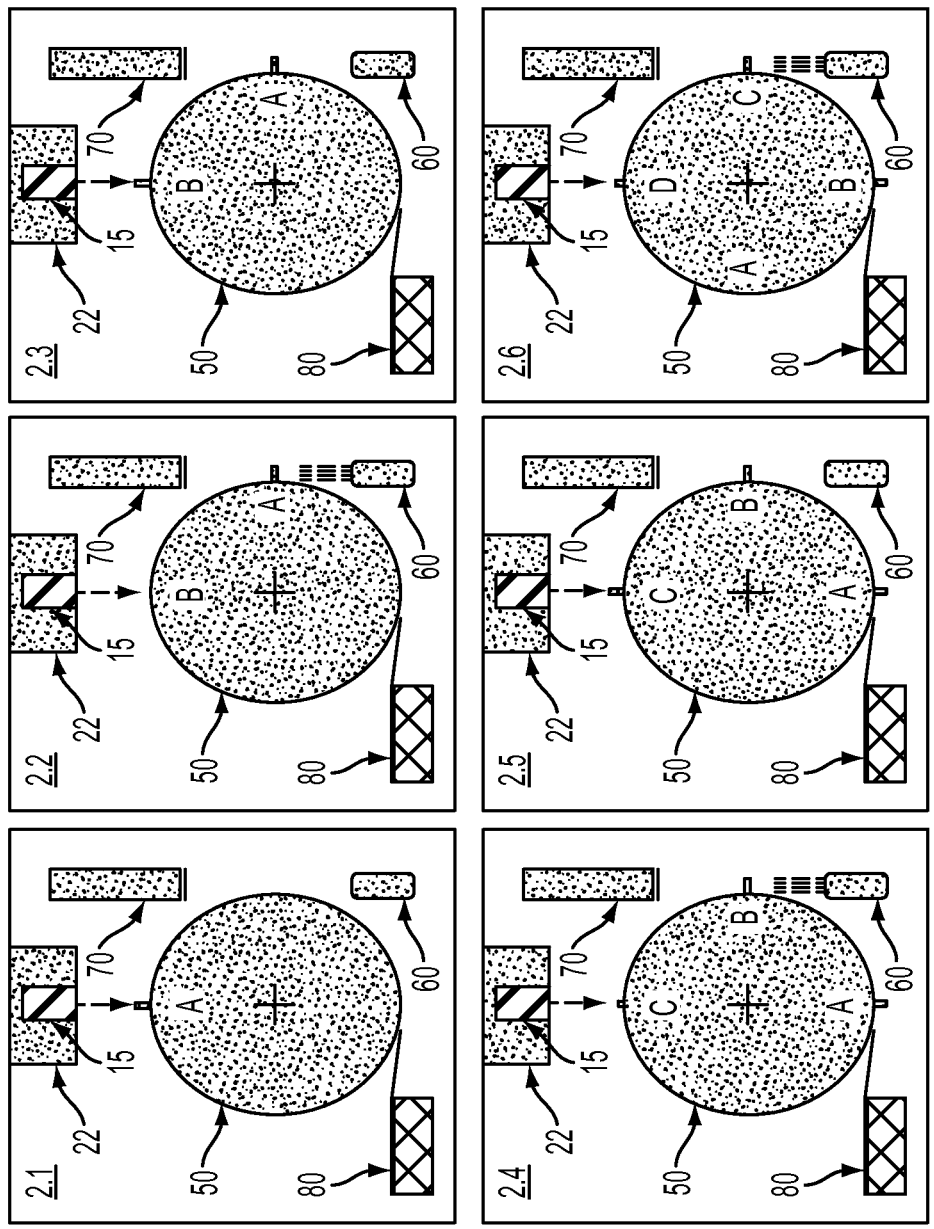
FIG. 2 illustrates a process by which inoperative inkjets in a three-dimensional object printer are detected.

FIG. 2 illustrates the process by which inoperative inkjets in a three-dimensional object printer are detected. The process is illustrated with six operations, which are labeled with numbers 2.1-2.6, as the shaft 50 is rotated through four positions. Each illustration depicts the printhead 22 with inkjets 15, the shaft 50, light source 60, sensor 70, and wiper 80. The shaft 50 includes the locations A, B, C, and D. The operation of the devices throughout the process is controlled by a controller, such as controller 34 (FIG. 1).

In operation 2.1, the inkjet 15 ejects drops of material onto the shaft 50 while the shaft is located at position A. Inkjet 15 in FIG. 2 is a single inkjet positioned at one end of a row of inkjets. All or selected inkjets in the row can be operated to form the test pattern. In one embodiment each drop is ejected onto the shaft 50 at position A simultaneously. In another embodiment the material is accumulated on the shaft 50 at position A over a series of ejections from the inkjets 15. After the series of ejections is completed to form a column of material for each inkjet used to eject the material, the printhead(s) 22 return to build area on platen 14 for one or more build cycles. In operation 2.2, the shaft 50 rotates 90 degrees placing position B proximate to the printhead and position A between the light source 60 and sensor 70 so the inkjets 15 can eject material onto the shaft 50 at position B. Meanwhile, the light receptors in the sensor 70 and the light source 60 are operated in one of the manners discussed above to generate image data of the material on the shaft. If three-dimensional data is to be generated, then the shaft is rotated incrementally about this position as described above to enable the three-dimensional data to be generated. The controller receives these signals and compares each one to a value that corresponds to the image data used to operate the inkjets and form the test pattern. If the signal corresponds to an amount of light that corresponds to an amount of material on the shaft 50 that blocks the light from reaching the sensor 70 at a height corresponding to the image data used to eject material from the inkjets, then the inkjets are operating correctly. If the signal corresponds to an amount of light that indicates the material on the shaft 50 that blocked the light from reaching the sensor 70 is at a height that is greater than or less than an amount of material corresponding to the image data used to eject material from the inkjets by a predetermined threshold, then the inkjets corresponding to those receptors generating such a signal are either inoperative or not ejecting an appropriate amount of material at each ejection. In one embodiment, the inkjets 15 ejecting ink onto the shaft 50 at position B are different than the inkjets 15 that ejected ink onto the shaft 50 at position A. This type of operation enables different groups of inkjets to be tested with each test pattern.

In operation 2.3, the inkjets 15 finish ejecting material on the shaft 50 at position B. In operation 2.4, the shaft 50 has rotated 90 degrees such that position C is proximate the printhead 22, position B is proximate the light source 60 and sensor 70, and position A is proximate the wiper 80. As another group of inkjets 15 begin ejecting material onto the shaft 50 at position C, sensor 70 generates signals corresponding to the amount of light received from source 60 and the height of the material at position B, as described above. In operation 2.5, the inkjets 15 finish ejecting material onto the shaft 50 at position C. In operation 2.6, the shaft 50 has rotated 90 degrees so position D on the shaft 50 is proximate the printhead 22, position C is proximate the light source 60 and the sensor 70, and position B is proximate the wiper 80. During rotation, the wiper 80 has removed the material from position A, a group of inkjets 15 begins ejecting material onto the shaft 50 at position D, and sensor 70 generates signals corresponding to the amount of light received from source 60 and the height of the material at position C.

Figure 3:
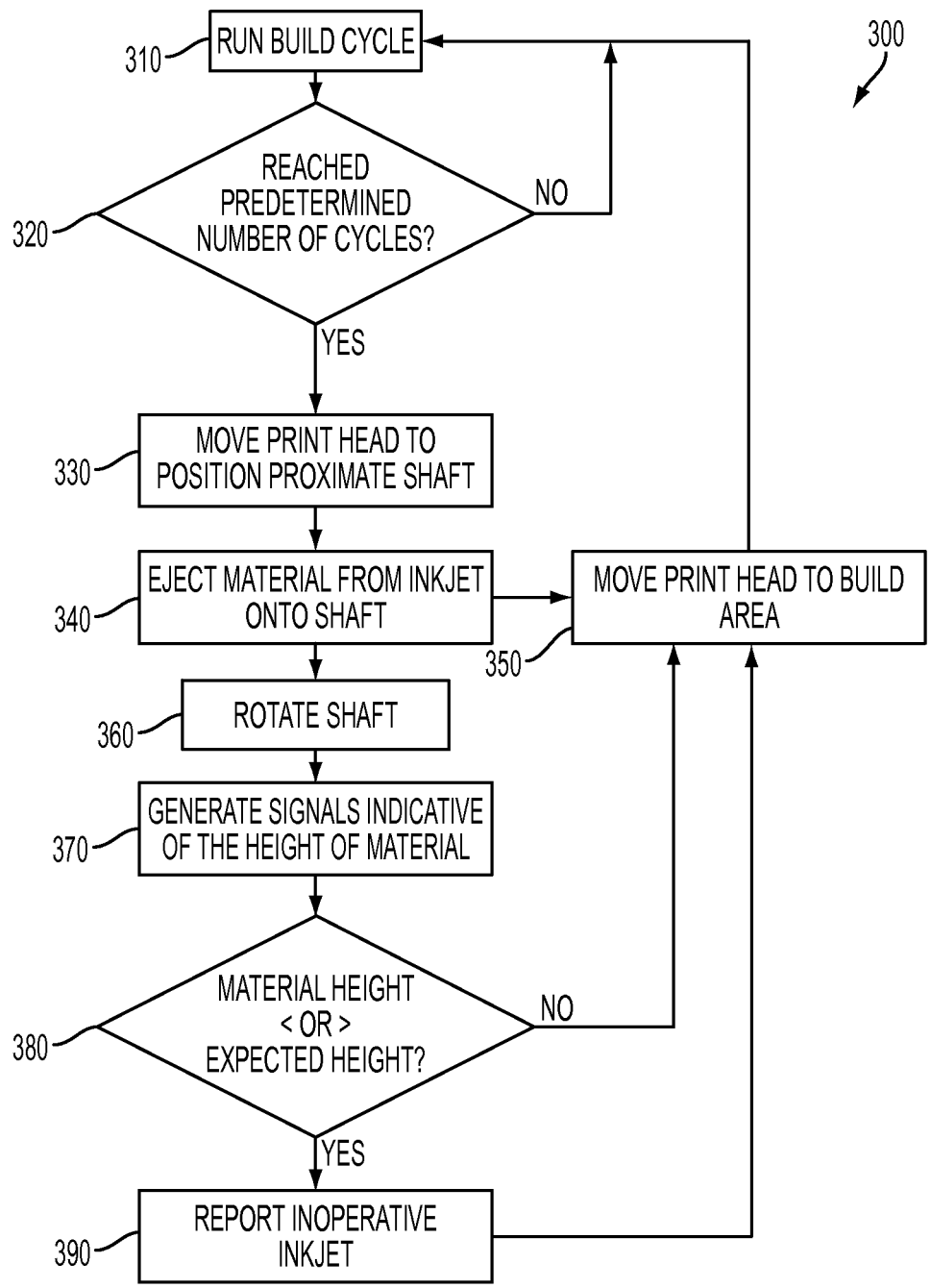
FIG. 3 is a flow diagram of a method for identifying and reporting inoperative inkjets in a three-dimensional object printer.

FIG. 3 is a flow diagram of a method 300 for identifying and reporting inoperative inkjets in a three-dimensional object printer. In the following description of this method, statements that a process is performing some task or function refers to a controller or general purpose processor executing programmed instructions stored in non-transitory computer readable storage media operatively connected to the controller or processor to manipulate data or to operate one or more components in the printer to perform the task or function. The controller 34 noted above can be such a controller or processor. Alternatively, these controllers can be implemented with more than one processor and associated circuitry and components, each of which is configured to form one or more tasks or functions described herein.

The method 300 begins with the three-dimensional object printer running build cycles to form an object 26 on the platen 14 (block 310). After each build cycle, the controller 34 determines if the printer has run the predetermined number of build cycles (block 320). If the predetermined number has not been reached, another build cycle is performed. If the number of build cycles has been reached, an actuator moves the printhead(s) 22 to a position proximate the shaft 50. From this position, the inkjets 15 eject material onto the shaft 50 (block 340). The controller then operates an actuator to move the printhead(s) 22 into the build area (block 350) and operates another actuator to rotate the shaft 50 ninety degrees (block 360). Once in the build area, the number of build cycles counted is reset, the printhead(s) 22 runs a build cycle, and the counting of the build cycles resumes.

The rotation of shaft 50 positions the material ejected from the inkjets 15 to enable the material ejected onto the shaft 50 to be between the sensor 70 and the light source 60 (block 360). Each light receptor in the sensor 70 generates a signal indicative of the amount of light received and the height of the material between the receptor and the light source 60, which is transmitted to the controller (block 370). The controller 34 compares the signals generated by the sensor 70 to a value corresponding to an expected height of the material corresponding to the image data used to operate the inkjets (block 380). If two-dimensional or three-dimensional data are generated by the sensor 70, then the data are compared to the image data for operating the inkjets to determine if the axial position alone or the axial and circumferential positions of the drops are correct. If the expected height or positions were not achieved for the material ejected by an inkjet corresponding to a light receptor in sensor 70, then the controller 34 reports the inoperative inkjet (block 390). When process 300 returns the printhead(s) 22 for the second time to the position over the shaft 50, another group of inkjets 15 eject material onto the shaft 50.

In one embodiment, the inkjets 15 ejecting material onto the shaft 50 are different than the inkjets 15 that ejected material onto the shaft 50 the first time. In one embodiment, the inkjets 15 eject material onto the shaft 50 multiple times in the same position before rotating the shaft. In this embodiment, the controller determines whether the inkjets have been operated the predetermined number of times before proceeding to return the printhead(s) 22 to the build area on platen 14 and to rotate the shaft 50.

In operation, a three-dimensional object printer is configured with a shaft 50, light source 60, sensor 70 and the controller 34 is configured in one of the ways explained above to operate these components and move the printhead(s) 22 with reference to the platen 14 and the shaft 50. After the predetermined number of build cycles is performed, the printhead(s) 22 are moved to eject material onto the shaft 50, the printhead(s) 22 returned to the build area, the shaft 50 is rotated, and the light source 60 and sensor 70 operated to generate signals that enable the controller 34 to identify any inoperative inkjets among the inkjets operated to eject material onto the shaft. If one or more inoperative inkjets are detected, the build cycles are terminated or a missing inkjet compensation scheme is implemented to address the inoperative inkjet.

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed:

1. A three-dimensional object printer comprising:
    at least one printhead having a plurality of inkjets configured to eject material;
    a shaft configured to rotate selectively;
    at least one light source positioned to emit light at a tangent to a circular cross-section of the shaft;
    at least one light sensor positioned to receive light on the tangent to the circular cross-section of the shaft; and
    a controller operatively connected to the at least one printhead, the shaft, the at least one light source and the at least one light sensor, the controller being configured to operate a first group of the inkjets in the at least one printhead to eject material onto the shaft, to rotate the shaft to a position that enables the material on the shaft to be on the tangent to the circular cross-section of the shaft between the at least one light source and the at least one light sensor to enable the at least one sensor to generate signals indicative of a height of material at a plurality of positions on the shaft, and to compare the signals generated by the at least one light sensor to an expected height value to identify inoperative inkjets in the at least one printhead.

2. The three-dimensional object printer of claim 1 further comprising:
    a wiper; and
    the controller is operatively connected to the wiper, the controller being further configured to move the wiper to remove the material ejected onto the shaft from the shaft.

3. The three-dimensional object printer of claim 2, the controller being further configured:
    to operate a second group of inkjets in the at least one printhead to eject material onto the shaft after the controller has rotated the shaft to the position that enables the at least one light sensor to generate signals indicative of the height of material at the plurality of positions on the shaft, the first group of inkjets being different than the second group of inkjets.

4. The three-dimensional object printer of claim 1 further comprising:
    an actuator operatively connected to the at least one printhead; and
    the controller being operatively connected to the actuator, the controller being further configured to operate the actuator to move the at least one printhead from an area in which the at least one printhead is operated to build an object to a position proximate the shaft to enable the plurality of inkjets in the at least one printhead to eject material onto the shaft.

5. The three-dimensional object printer of claim 4, the controller being further configured to operate the actuator to move the at least one printhead to the position proximate the shaft after a predetermined number of operations of the at least one printhead in the area in which the at least one printhead is operated to build an object.

6. The three-dimensional object printer of claim 5, the controller being further configured to operate the first group of inkjets a predetermined number of times greater than one to accumulate material at the plurality of positions on the shaft corresponding to the first group of inkjets.

7. The three-dimensional object printer of claim 1, the at least one light source and the at least one light sensor being configured to move along a longitudinal length of the shaft.

8. The three-dimensional object printer of claim 1, the at least one light source further comprising:
   a plurality of light emitters arranged to correspond to the plurality of positions on the shaft; and
   the at least one light sensor further comprising:
   a plurality of light receptors arranged to be opposite the plurality of light emitters.

9. The three-dimensional object printer of claim 8, the plurality of light sources and the plurality of light receptors, each being arranged in a linear array across a longitudinal length of the shaft.

10. The three-dimensional object printer of claim 8, the plurality of light receptors and the plurality of light receptors, each being arranged in a two-dimensional array across a longitudinal length of the shaft.

11. The three-dimensional object printer of claim 8, the shaft being further configured to rotate through three positions between the at least one light source and the at least one light sensor to enable three-dimensional image data of the ejected drops and the shaft to be generated by the at least one light sensor.

* * * * *